United States Patent [19]
Taylor

[11] Patent Number: 5,613,061
[45] Date of Patent: Mar. 18, 1997

[54] NETWORK CONTROLLER WITH RECONFIGURABLE PROGRAM LOGIC CIRCUITS CAPABLE OF PERFORMING BOTH CHANNEL SERVICE AND TESTING FUNCTIONS

[75] Inventor: Steven C. Taylor, Hillsborough, Calif.

[73] Assignee: Verilink Corporation, San Jose, Calif.

[21] Appl. No.: 468,132

[22] Filed: Jun. 6, 1995

Related U.S. Application Data

[63] Continuation of Ser. No. 304,202, Sep. 12, 1994, abandoned.

[51] Int. Cl.[6] ................................................ G06F 11/00
[52] U.S. Cl. ................................. 395/183.06; 395/183.19
[58] Field of Search ........................ 395/183.19, 185.09, 395/182.02, 183.06, 183.07, 783.19, 183.01; 371/20.1, 20.4, 20.5, 20.6

[56] References Cited

U.S. PATENT DOCUMENTS

| | | | |
|---|---|---|---|
| Re. 30,037 | 6/1979 | Bass | 340/146.1 |
| 3,668,474 | 6/1972 | Knox | 317/28 |
| 5,027,343 | 6/1991 | Chan et al. | 370/17 |
| 5,163,052 | 11/1992 | Evans et al. | 371/18 |
| 5,189,663 | 2/1993 | Williams | 370/17 |
| 5,195,085 | 3/1993 | Bertsch et al. | 370/13 |
| 5,289,461 | 2/1994 | de Nijs | 370/58.1 |
| 5,296,956 | 3/1994 | Fatehi et al. | 359/110 |
| 5,343,461 | 8/1994 | Barton et al. | 370/13 |
| 5,375,126 | 12/1994 | Wallace | 371/20.1 |

OTHER PUBLICATIONS

J. Cheng et al., "An Integrated Maintenance Methoclology for IDSN", 1990 IEEE Conference on Communications, pp. 309–314.

Naughdahl and Thurber, "LAN Management Technology", 1989 Local Computer Artwork 14th Conference IEEE pp. 150–155.

Martins et al., "Integrated Management Systems for Interconnected Local Area Networks", Melcon 1991, IEEE pp. 1113–1116.

*Primary Examiner*—Robert W. Beausoliel, Jr.
*Assistant Examiner*—Joseph E. Palys
*Attorney, Agent, or Firm*—David Newman & Associates, P.C.

[57] ABSTRACT

A network controller card having a processor, memory and program logic. The program logic can be used as communications circuits and as testing circuits. A reconfigure signal from a workstation remotely located from the network controller card initiates the processor to change the program logic from communications circuits to testing circuits and vice versa.

24 Claims, 5 Drawing Sheets

NETWORK CONTROLLER WITH RECONFIGURABLE PROGRAM LOGIC CIRCUITS CAPABLE OF PERFORMING BOTH CHANNEL SERVICE AND TESTING FUNCTIONS

This application is a continuation of application Ser. No. 08/304,202, filed Sep. 12, 1994, now abandoned.

BACKGROUND OF THE INVENTION

This invention relates to channel service units and access multiplexers, and more particularly to reconfiguring channel service units and access multiplexers as test equipment for testing communication channels between a network and the channel service unit or access multiplexer, or between customer premise equipment and the channel service unit and access multiplexer.

DESCRIPTION OF THE RELEVANT ART

Channel service units and access multiplexers are well known in the art. An access multiplexer may interface customer premise equipment, such as a local area network, private branch exchange, or other equipment, with a larger area network. The access multiplexer typically formats the customer signal to a T1, T3, or other format used over the large area network. A channel service unit similarly performs a formatting function necessary to meet certain communication system requirements.

Traditional testing methodology includes hardware zest sets and personal-computer-based software/hardware test systems. The hardware test sets are well known to be portable and rugged, as individual pieces of equipment. The hardware test sets may require a specialized interface for each type of testing. Alternatively, the hardware test sets may provide multiple interfaces for several types of testing. Often the hardware test sets are equipped with communications capability to enable remote control by a dumb terminal or software running on a personal computer. The software on the personal computer is for controlling the hardware set and is typically not part of the test capability.

Hardware test sees are costly, with prices ranging at the current market rate between one thousand to over fifty thousand dollars. In addition, for remote testing, the hardware test sets require a separate communications facility. The high cost and facility requirements create a problem in that the capital investment is not put to work since testing is only performed during installation or when something breaks. Additionally, specialized hardware interfaces are redundant, since the access multiplexer equipment or channel service unit are already prewired into a circuit which provides an interface for normal communications, and this interface is the same as would be used for normal testing.

Personal computers using software to control hardware test systems have advanced the art by allowing the personal computer to remotely control a hardware test set. However, these types of systems still require specialized hardware interfaces for each type of line or equipment. The interfaces may be in the form of an expansion bus card which goes into the personal computer or may be an external box which communicates with the personal computer via a serial or parallel port. High speed data analysis functions are part of this hardware, but some low speed functions may be performed in software alone.

The personal-computer-based software/hardware test systems typically have a better "human interface" capability than do traditional hardware test sets, not being limited to the fixed switches and light emitting diode (LED) readouts of a hardware test set system. Instead, graphical user interface (GUI) and Windows displays are common.

The personal-computer-based software/hardware test systems often allow users to create customized displays or test sequences to fit a specialized need. With few exceptions, however, remote testing requires specialized hardware interfaces at all locations where testing may be required or desirable. These systems typically have a high cost, involve specialized hardware interfaces which are redundant, require a separate communications facility, and result in capital investment which is not put to work. If the remote testing were done with remote test equipment, then a switching matrix, and an appropriate interface for each type of channel, would be required to switch the remote test equipment, and appropriate interface, into the proper circuit. The disadvantages of this method and equipment would be high cost of the equipment, including installation, wiring and maintenance of the switching matrix, remote test equipment and interfaces, lower reliability since all ports would be wired through the switch matrix, and typically only one channel would be capable of being tested at any one time.

SUMMARY OF THE INVENTION

A general object of the invention is having any type of data terminations available for remote testing from a network control center.

Another object of the invention is to reduce the historical capital equipment and manpower requirements of performing out-of-service testing on communication circuits and equipment.

An additional object of the invention is to remotely place an in-circuit communication analyzer system which can test toward the network or toward the customer premise equipment.

A further object of the invention is a remote user interface capability which can remotely operate from locations used to manage the communications network.

According to the present invention, as broadly described herein, a method and system for reconfiguring an access multiplexer/channel service unit as communications test equipment is provided. The method and system has a network control unit located at the access multiplexer/channel service unit. The network control unit, or network controller card, includes program logic, a processor, and a memory. Remotely located from the access multiplexer/channel service unit is a work station.

The method and system comprise the steps of setting the program logic circuits as communication circuits for performing as a channel service unit and/or as an access multiplexer. Thus, the communication circuits initially may be set and perform as a channel service unit and/or access multiplexer. The method includes initiating from the work station a first reconfigure signal. The first reconfigure signal is sent through the communications channel to the network control unit, located in the access multiplexer/channel service unit. Upon receiving the first reconfigure signal, the processor reconfigures, using software in the memory, the program logic circuits as testing circuits. The testing circuits are used for testing the communications channel. Dependent upon the commands in the reconfigure signal, the program logic circuits may be reconfigured for testing all the channels or a subset of the channels coming to the channel service unit or access multiplexer. Thus, the program logic circuits, on the one hand, function as an access multiplexer and/or channel service unit. The access multiplexer and/or channel service unit can serve as an interface between many types of channels, simultaneously. Upon reconfiguring the program logic circuits, the program logic circuits function as the test equipment for testing the communications channel. The program logic circuits may be reconfigured for testing a single channel, a subset of all the channels, or all the channels, simultaneously. In the event the program logic circuits are reconfigured as testing circuits for a subset of the channels, then the program logic circuits may continue functioning as communications circuits for those channels for which the program logic circuits are not reconfigured.

When testing is complete, the program logic circuits, which were used as testing circuits, may be reconfigured as communications circuits. Thus, the work station can send a second reconfigure signal through the communications channel to the network control unit. Upon receiving the second reconfigure signal, the processor reconfigures, using software in the memory, the program logic circuits, which were being used as testing circuits, as the communications circuits.

Additional objects and advantages of the invention are set forth in part in the description which follows and in part are obvious from the description or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention and together with the description serve to explain the principles of the invention.

DETAILED DESCRIPTION OF THE PREFERRED EMBODIMENTS

Figure 1:
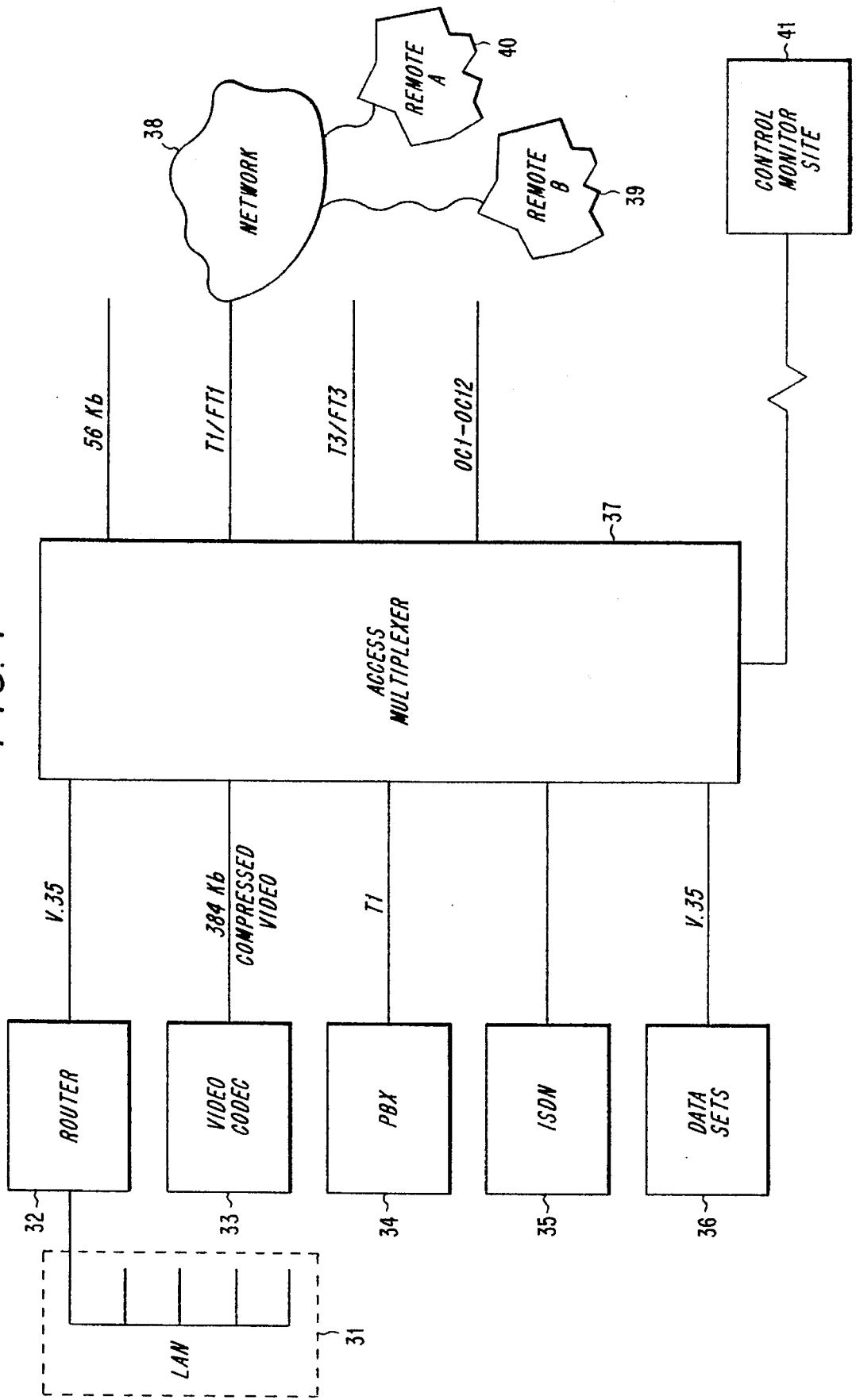
FIG. 1 illustrates an access multiplexer connecting customer premise equipment to a wide area network.

Reference now is made in detail to the present preferred embodiments of the invention, examples of which are illustrated in the accompanying drawings, wherein like reference numerals indicate like elements throughout the several views.

In the exemplary arrangement shown in FIG. 1, an access multiplexer 37 is connected between customer premise equipment including router 32, video codec 33, private branch exchange (PBX) 34, integrated services digital network (ISDN) 35, and data sets 36. The customer equipment side of the access multiplexer and the customer premise equipment typically are slow speed communications channels. The router 32 is connected to a local area network (LAN) 31. On the network side, the access multiplexer 37 is connected to a wide area network 38, which may be connected further to remote area network A 40 and remote area network B 39. Additionally, a control monitor site 41 is remotely connected to the access multiplexer 37. The network side of the access multiplexer typically interfaces to high speed communications channels.

As is well known in the art, the access multiplexer 37 is used to change the format of data coming from a local area network 31 through router 32 using V.35, for example, to a T1 format for transmission over the wide area network 38. Additionally, video codec 33 may have other formats such as compressed video at 384 kilobits per second (Kbps) converted to proper T1 format. Furthermore, the access multiplexer 37 can multiplex the output from the router 32, video codec 33, private branch exchange 34, ISDN 35, data sets 36, to the proper formats. The outputs of the access multiplexer can be any of T1, T3, OC1–OC12, or other formats. The OC12–OC12 formats are used with optical cables. The control monitor site 41 may be remotely located from the access multiplexer 37. The control monitor site 41 monitors and controls the performance of the access multiplexer. Similar to an access multiplexer 37, a channel service unit may be substituted for more limited uses.

Figure 2:
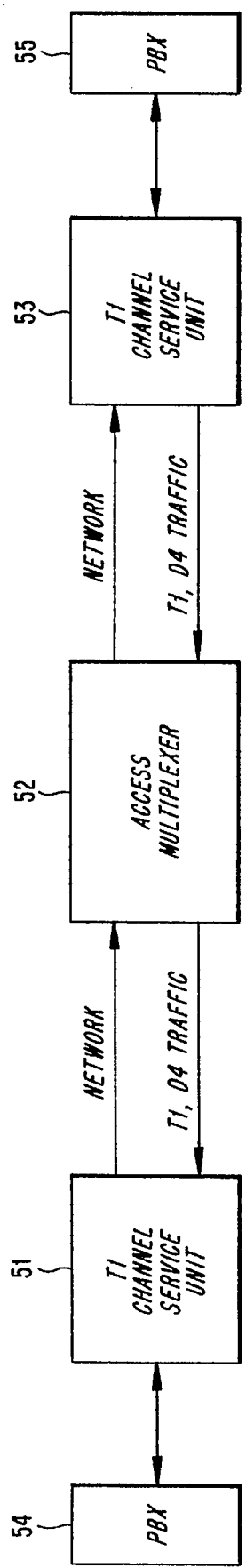
FIG. 2 shows a channel service unit connected between a private branch exchange at customer premise equipment and an access multiplexer in a wide area network.

As shown in FIG. 2, a channel service unit 51 may interface customer premise equipment and a network. The channel service unit 51 may convert the T1 D4 traffic to a format for sending over the wide area network.

A first channel service unit 51 may be located at the customer premise equipment, shown as a private branch exchange (PBX) 54. A second channel service unit 53 may be located at customer premise equipment, shown as private branch exchange (PBX) 55. The second channel service unit 53, may interface through an access multiplexer 52 to the first channel service unit 51. The first channel service unit 51, working with the second channel service unit 53, also may test the communications link between either channel service unit 51, 53 and the access multiplexer 52.

Figure 3:
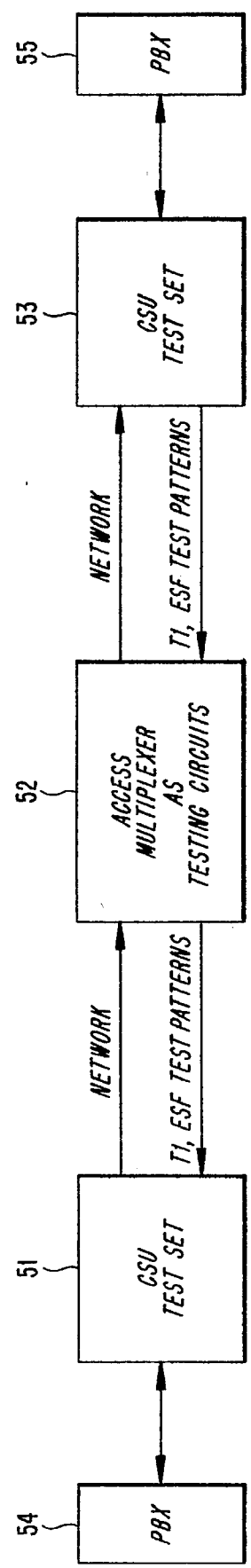
FIG. 3 illustrates the channel service unit of FIG. 2 configured as testing circuits, and the access multiplexer configured as testing circuits.

As shown in FIG. 3, program logic circuits within the access multiplexer 52, and the program logic circuits within the channel service unit 51, 53 may be reconfigured as testing circuits. The access multiplexer 52, configured as testing circuits, may be testing with T1, ESF test patterns with the first channel service unit 51. This allows testing of the communications link between the first channel service unit 51 and the access multiplexer 52. At the same time, the program logic circuits within the access multiplexer 52 may continue to operate as communications circuits for the communications channel between the access multiplexer 52 and the channel service unit 53.

The access multiplexer 52 also may be used for testing between the second channel service unit 53 and the access multiplexer 52. For this scenario, the program logic circuits within the access multiplexer 52 and the program logic circuits within the channel service unit 53 are reconfigured as testing circuits. Accordingly, the communications link between the access multiplexer 52 and the channel service unit 53 may be tested.

With the passage of time, testing techniques change because of new testing standards, and changing requlatory requirements. With the present invention the entire functionality is soft, and can be readily changed over time. The present invention allows one to keep up with changes without having to go into the test set and make physical changes.

Figure 5:
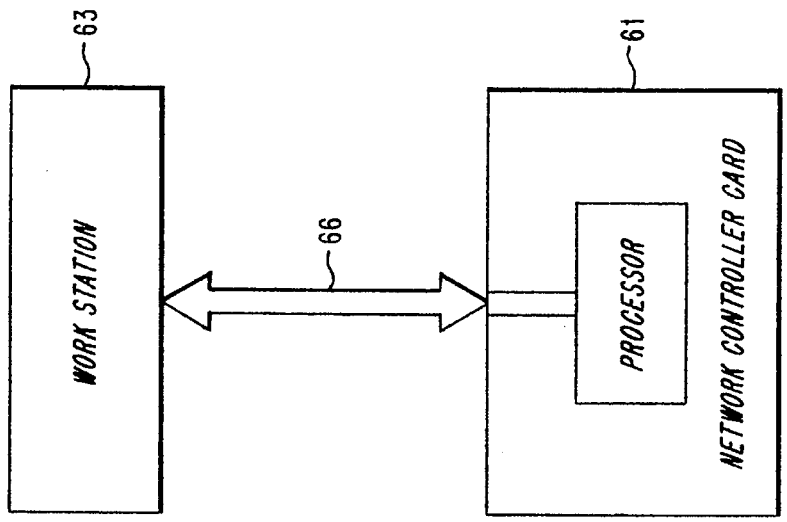
FIG. 5 shows a work station connected to the network a controller card.

The present invention includes network controller means, which includes program-logic means, processor means and memory means. The processor means is coupled to he program-logic means and the memory means. The processor means also is coupled through a communications link 66 to a work station 67 as shown in FIG. 5.

The program logic means may be configured as test circuits or communication circuits. The program-logic means is responsive to the processor means, which controls how the program-logic means operates. The software for controlling the processor means is typically stored in the memory means.

Figure 4:
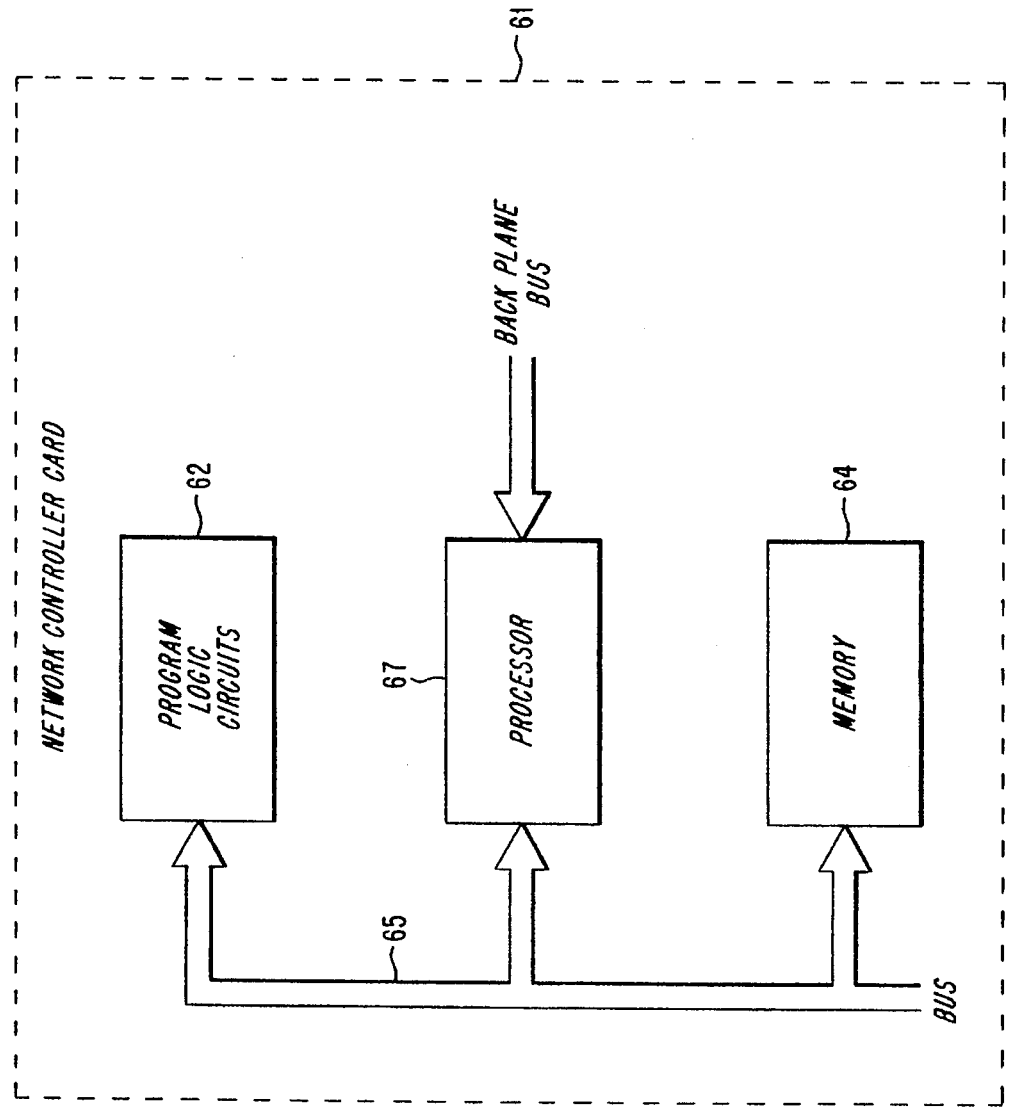
FIG. 4 is a block diagram of a network controller card having program logic, a processor and a non-volatile memory.

As shown in FIG. 4, the processor means is embodied as a processor 63, the memory means is embodied as a non-volatile reprogrammable memory 64, and the program-logic means is embodied as program logic circuits 62. The memory means may be embodied as other memory devices, such as disk or programmable read only memory, as is well known in the art. The program logic circuits 62 may include gate array circuits, or other circuits which are reconfigurable based on commands from the processor. The program logic circuits 62, processor 63 and read only memory 64 are coupled through bus 65. The processor 63 further is coupled through a back plane bus and, as shown in FIG. 5, through a communications channel 66 to the work station 67. The network controller means may be embodied on a card, such as network controller card 61, which inserts into the back plane of an access multiplexer or channel service unit.

Typically, the program logic circuits 62 operate as communication circuits. The communication circuits may function as an access multiplexer 37 or channel service unit 51, 53. Thus, the program logic circuits 62 may substitute for the function of the access multiplexer 37 as shown in FIG. 1.

Figure 6:
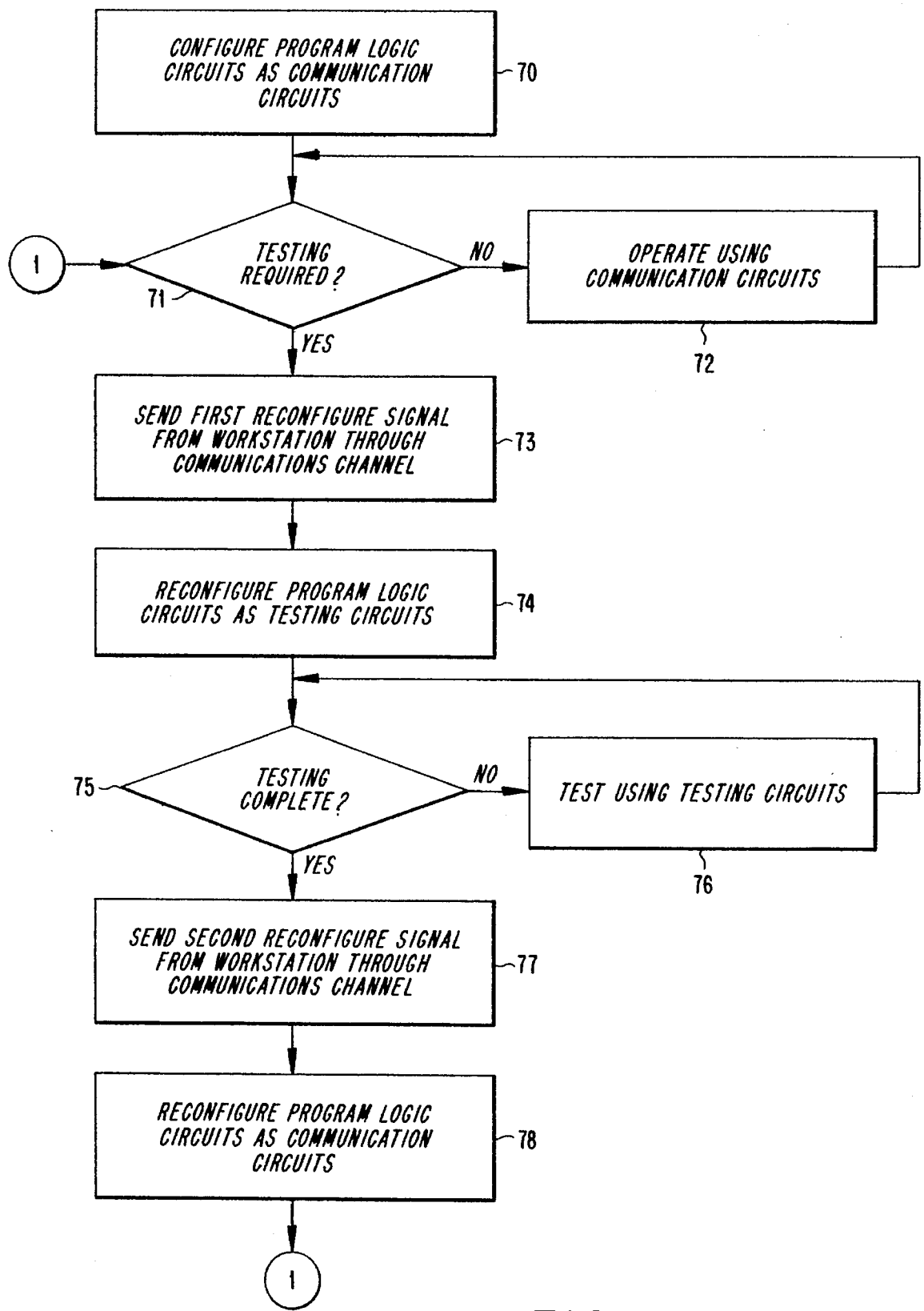
FIG. 6 is a flowchart illustrating the method of the present invention.

As shown in FIG. 6, according to the method of the present invention, the program logic circuits are set 70 as communication circuits during normal use. If testing in not required 71, the system operates 72 using the communication circuits. If testintg is required 71, the first reconfigure singal is sent 73 from the workstation to the processor 63. An response to a first reconfigure signal, sent 73 from the work station 67 through the communications channel 66 to the processor 63, the processor 63 reconfigures 74 the program logic circuits 62 as testing circuits. While reconfiguring the program logic circuits 62, the processor 63 uses software embedded in the nonvolatile reprogrammable memory 64. The processor 63 may reconfigure the program logic circuits 62 so that all the communications channels see the program logic circuits 62 as test circuits, or some of the communications channels see the program logic circuits 62 as test circuits and other communications channels see the program logic circuits 62 as communications circuits. Accordingly, the network controller card 61, located in the access multiplexer 37 of FIG. 1, changes the function of the access multiplexer to test circuits, or partially retains the function of the access multiplexer 37 as communications circuits and partially changes the function of the access multiplexer 37 to test circuits. As test circuits, the program logic circuits 62 are used to test 76 and support measurement and analysis of errors, T-carriers performance, frequency and time, alarms, data links, signal LEDS, and alarm LEDS.

When taking error measurements, the test circuits can analyze bit errors, average bit error rate, blocks, average block error rate, block error rate and clock slip. When taking T-carrier measurements, the test circuits can analyze frame errors, average frame error rate, severe frame errors, frame synchronization losses, cyclic redundance code (CRC) errors, average CRC error rate, bipolar violations, average bipolar violations rate, bipolar rate, and data link FCS error. The performance measurements may include available seconds, percent available seconds, unavailable seconds, error free seconds, percent error free seconds, violation free seconds, percent violation free seconds, synchronization seconds, percent synchronization seconds, severely errored seconds, percent severely errored seconds, violated seconds, percent violated seconds, severely violated seconds, percent severely violated seconds, degraded minutes, percent degraded minutes, synchronization loss seconds, signal loss seconds and errored seconds.

While performing frequency and time measurements, the testing circuits may test T1 transmit frequency, T1 receive frequency, FT1 port transmit frequency, FT1 port receive frequency, external clock frequency, auxiliary. T1 reference line frequency and round trip delay. Alarm measurements made by the test circuits include loss of signal, loss of data, loss of clock, yellow alarm, all ones, low average density, excess zeros, line code configuration alarm (B8ZS, XBTSI, AMI) and loss of power.

The data link analysis which may be conducted by the test circuits included real time display of PRMS, real time display of BOPS, real time display of MOPS, protocol analyzer mode and hex or binary display. The testing circuits may also test signal light emitting diodes (LEDs) and alarms LEDs including T1 pulses present, pattern synchronization, frame synchronization, B8ZS coding received, signal loss, pattern loss, frame loss, ones density error, excess zeros, yellow alarm, all ones, controlled slips, and coding mismatch detected (B8ZS vs. AMI).

With such a broad range of capabilities and inherent flexibility, the present invention can completely replace physical test sets. Instead of having a physical test set, the access multiplexer is simply transformed from a communications configuration to a test circuit which can perform the above functions.

An additional advantage to the present invention is that the system can be reconfigured as a test set, and the test set is always available at each data termination for remote testing from the network control center. Thus, the access multiplexer can perform as an interface unit, and then be reconfigured as a test unit remotely at any time. Upon completion of the job of serving as a test set, the system, in response to a second reconfigure signal, can be reconfigured back to communication circuits.

Returning to the method steps as illustrated in FIG. 6, when testing is complete 75, the processor 63 uses software embedded in the nonvolatile reprogrammable memory 64 to reconfigure the program logic circuits 62. In response to a second reconfigure signal sent 77 from the workstation to the processor through the communications channel, the processor 63 reconfigures 78 the program logic circuits 62 to function as communication circuits. Accordingly, the network controller card 61, located in the access multiplexer 37 of FIG. 1, changes the function of the access multiplexer to communication circuits.

With the program logic circuits 62 operating 72 as communications circuits, the system may function as an interface and can be configured to have the following capabilities: transmit frequency capability, aggregate framing capability, line code capabilities, error insertion capabilities, interface capabilities, and data link generator capabilities.

The transmit frequency capability includes transmit frequency synthesizer, recovered from receiver line, recovered from separate T1 reference line, recovered from FT1 port (n×56 or n×64), external TTL, and external RS422. The transmit frequency synthesizer may perform n×56 Kbs, n×64 Kbs, T1 (1.544 Mbs), E1 (2.048 Mbs) with a synthesizer adjustable with ± 400 Hz in 1 Hz increments.

Aggregate framing capability includes ESF, SF (D2, D3, D4), SLC-96, unframed, and CCITT G.703. Line code capabilities include AMI, B8ZS, HDB3, and ZBTSI. The error insertion capabilities may include single test pattern logic error, single frame error, single severe frame error, single bipolar violation, and user programmable insertion error rate. The interface capabilities include T1 having a T1 repeater, DSX1 line interface with equalizer and bridge monitor or terminate receiver, E1 with a 75 ohm unbalanced, FT1 with a 56 Kbs to 1.536 Mbs synchronous in n×56 Kb or n×64 Kb increments. Asynchronous ports may include RS232D or 1200 baud to 56 Kilobaud. The data link generator capabilities may include AT&T type message generation, T1.403 PRM Generation, and user data generation.

The present invention can be placed remotely in circuits anywhere an access multiplexer is installed and is configurable to act as a test set either toward the network or toward the customer premises equipment. Thus, unlike the traditional arrangement in which test equipment must be carried by an individual to the access multiplexer remote location for each test, with the present invention there is no need to have an individual go to the remote location to install a test set or to change its orientation. Rather, the present invention can be remotely installed and operated from any location used to manage the communication network.

Figure 7:
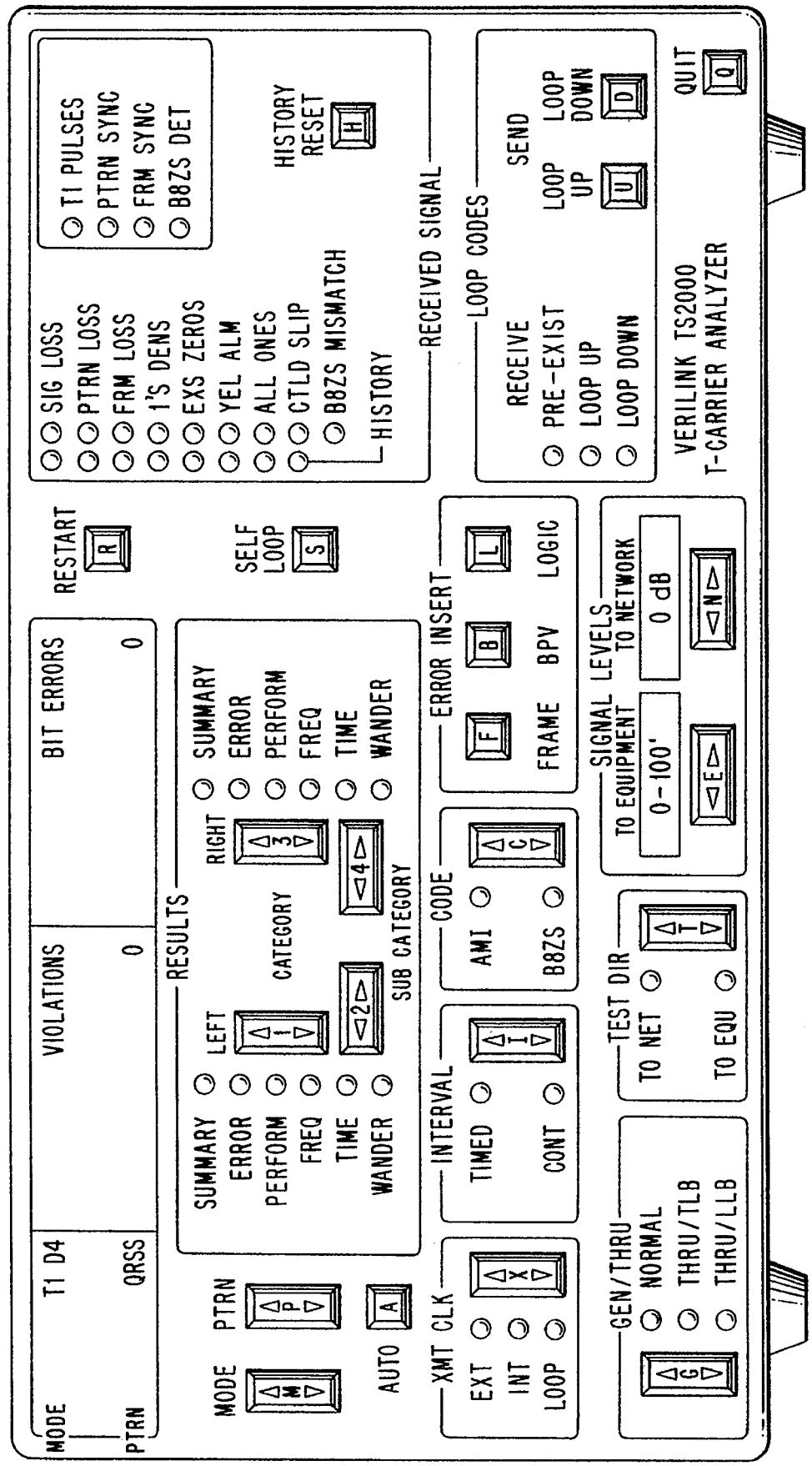
FIG. 7 illustrates a user interface.

The present invention takes advantage of advanced programmable architecture to perform in-service and out-of-service testing of communication circuits and equipment. The specific test capabilities vary with the specific interface plug to which software has been downloaded. For example, when downloaded to a T1 channel service unit plug, such as an NCC or TAC, the available tests and user interface are as shown in FIG. 7. If, however, the software were downloaded to a multi-port fractional T1 multiplex plug, then the user interface screen and available tests are specific to data circuit and equipment needs. The appropriate user interface screen is automatically displayed at the work station, based upon the type of plug to which the software is downloaded. Downloading can be done either remotely or locally.

Using plug-in modularity and advanced programmable architecture, the present invention provides a wide range of network applications from a simple T1 channel service unit to up to thirty T1 lines for various private line and switched services. The advanced programmable architecture utilizes programmable gate arrays and nonvolatile flash memory technology to provide a uniquely flexible platform for implementing change without obsoleting existing hardware. On download of software from a remote terminal, the programmable gate arrays actually alter the circuits of the device. Reprogramming thereby saves the cost of replacement hardware and eliminates the allocation of labor and time associated with hardware changeouts typical of the traditional application-specific integrated circuit (ASIC) architecture technology.

The present invention may also be embodied as an access multiplexer integrated DSU/CSU (IDCSU). The IDCSU represents a cost-effective means of providing a single high-speed data application port and T1 network interface on a single module. The integrated, single module capability allows a very high density of T1 DSU/CSUs to be deployed at a site, and it features diagnostics, DS0 channelization flexibility, full network T1 Extended Superframe (ESF) performance monitoring, and management capability.

The IDCSU can be deployed through a field upgrade to existing equipment. Software is loaded to create a single-port T1 DSU/CSU using the identical hardware modules of the access multiplexer carrier access modules. An appropriate connector module is added to provide interfaces to the network and to the Data Terminal Equipment (DTE) or Data Communications Equipment (DCE) applications.

Integrated high-speed/low-speed modules can be used to provide either a high-speed (V0.35) or high-speed (RS449) port and a low-speed RS232 port when used with the present invention access multiplexer. The low-speed ports are designed to be transparent so that in the network they appear like a direct-connect cable. Because both data and control leads are passed over the network, control leads used for monitoring of different units, e.g., as in an application in which a modem is monitored by a personal computer, are replaced by the wide area network using the access multiplexer. The high speed/low speed capability also applies to co-located high speed and low-speed units, e.g., a high-speed CAD/CAM graphics terminal networked with a low-speed plotter. The high-speed/low-speed modules also can be used to provide an in-band management channel between an access multiplexer and access multiplexer nodes.

The present invention may also include a 56K data service unit. The 56K data service unit allows an access multiplexer to manage remote dedicated 56K circuits, performing the following functions:

Monitor DDS control code information per AT&T

Identify and manage alarms on DDS control code

Send 56K loopback signals and test patterns

Monitor circuit data

The 56K is available as an upgrade to an existing plug-in module either as a EPROM upgrade or as a software downloadable circuit upgrade. The resulting plug-in module provides digital dataphone service.

As an advanced programmable architecture option, T1 dial backup capability can be added to the present invention by downloading software to alter the circuits of an existing plug-in module. The T1 dial backup option, used to backup T1 and FT1 circuits and 56K circuits that have been multiplexed onto a T1, provides a cost-effective solution to the problem of ensuring satisfactory up-time for end users. Expensive, idle dedicated circuits are no longer needed for backup capability. The T1 dial backup option initiates backup from either end of a circuit in the event of a failure detected on recognition of T1 loss of frame or abnormal station code. Switching to the backup circuit can occur automatically or manually, and the failed circuit remains accessible for troubleshooting.

It will be apparent to those skilled in the art that various modifications can be made to the network access system and method of the instant invention without departing from the scope or spirit of the invention, and it is intended that the present invention cover modifications and variations of he network access system and method provided they come within the scope of the appended claims and their equivalents.

I claim:

1. A method using communications facility termination equipment having a network controller, said network controller comprising program logic circuits, a processor, and a memory, for changing a function of said program logic circuits by configuring, from a workstation remotely located from the network controller and communications facility termination equipment, said program logic circuits as communications circuits and for reconfiguring, from said workstation, said program logic circuits as test circuits, comprising the steps of:

setting the program logic circuits as communications circuits for operating the communications facility termination equipment as a channel service unit;

performing, by the channel service unit, responsive to the communications-circuits-setting of the program logic circuits, channel service unit functions;

initiating, from the workstation, a first reconfigure signal;

sending the first reconfigure signal through a communications channel to the network controller;

setting, with the processor of the network controller, responsive to the first reconfigure signal, using software in the memory, the program logic circuits as test circuits for operating the channel service unit as a channel service unit test set; and performing, by the channel service unit test set, responsive to the test-circuits-setting of the program logic circuits, testing functions.

2. The method as set forth in claim 1, further including the steps of:

initiating, from the workstation, a second reconfigure signal;

sending the second reconfigure signal through the communications channel to the network controller;

reconfiguring, with the processor of the network controller, responsive to the second reconfigure signal, using software in the memory, the program logic circuits as communications circuits for operating the channel service unit test set as a channel service unit; and performing, by the channel service unit, channel service unit functions.

3. A method for changing a function of communications facility termination equipment interfacing a communications network and customer premise equipment, using a network controller coupled to said communications facility termination equipment and having program logic circuits, a processor, and a memory, by reconfiguring, from a workstation remotely located from the network controller, the program logic circuits via a communications channel such that the communications facility termination equipment operates, dependent on configuration of the program logic circuits, as at least one of an access multiplexer and a communications network test set, comprising the steps of:

configuring the program logic circuits as communications circuits;

performing, by the communications facility termination equipment using the communications-circuits-configured program logic circuits, access multiplexer functions;

initiating, from the workstation, a first reconfigure signal;

sending the first reconfigure signal through the communications channel to the network controller;

reconfiguring, with the processor and using software in the memory, responsive to the first reconfigure signal, the program logic circuits as test circuits; and performing, by the communications facility termination equipment using the test-circuits-reconfigured program logic circuits, test set functions.

4. The method as set forth in claim 3, with the step of performing, using the test-circuits-reconfigured program logic circuits, test set functions including testing toward the communications network.

5. The method as set forth in claim 3, further comprising the steps of:

initiating, from the workstation, a second reconfigure signal;

sending the second reconfigure signal through the communications channel to the network controller;

reconfiguring, with the processor and using software in the memory, responsive to the second reconfigure signal, the program logic circuits as communications circuits; and performing, by the communications facility termination equipment using the communications-circuits-reconfigured program logic circuits, access multiplexer functions.

6. The method as set forth in claim 3, with the access multiplexer functions including formatting customer premise equipment data to one of a T1, T3 and OC1–OC12 format for transmission over the communications network.

7. The method as set forth in claim 3, with the step of performing, using the test-circuits-reconfigured program logic circuits, test set functions including testing toward the customer premise equipment.

8. A method for changing a function of communications facility termination equipment interfacing a communications network and customer premise equipment by controlling, via a communications channel connected to a remotely-located workstation, a configuration of a network control unit operatively coupled to the communications facility termination equipment, said network control unit having program logic circuits, a processor, and a memory, comprising the steps of:

configuring the program logic circuits as communications circuits;

performing, by the communications facility termination equipment, responsive to the communications-circuits-configuration of the program logic circuits, communications functions between the communications network and the customer premise equipment;

initiating, from the workstation, a first reconfigure signal;

sending the first reconfigure signal through the communications channel to the network control unit;

reconfiguring, with the processor and using software in the memory, responsive to the first reconfigure signal, the program logic circuits as test circuits; and performing, by the communications facility termination equipment, responsive to the test-circuits-reconfiguration of the program logic circuits, testing functions.

9. The method as set forth in claim 8, further comprising the steps of:

initiating, from the workstation, a second reconfigure signal;

sending the second reconfigure signal through the communications channel to the network control unit;

reconfiguring, with the processor and using software in the memory, responsive to the second reconfigure signal, the program logic circuits as communications circuits; and performing, by the communications facility termination equipment, responsive to the communications-circuits-reconfiguration of the program logic circuits, communications functions.

10. The method as set forth in claim 8, with the communications facility termination equipment embodied as an access multiplexer.

11. The method as set forth in claim 8, with the communications facility termination equipment embodied as a channel service unit.

12. A system for remotely controlling and reconfiguring an interface unit in a network, said interface unit to perform communications and testing functions, comprising:

a workstation, for initiating a reconfigure signal;

a communications channel, operatively coupled to the workstation, for carrying the reconfigure signal;

a network controller card, remotely located from the workstation and operatively coupled to the communications channel, for responding to the reconfigure signal, said network controller card including a plurality of program logic circuits for operating as at least one of communications circuits and testing circuits;

a read-only memory containing software; and a processor, for receiving the reconfigure signal and for reconfiguring, using the software, the plurality of program logic circuits to operate as at least one of communications circuits and testing circuits;

an access multiplexer/channel service unit, operatively coupled to and controlled by said network controller card, for interfacing plurality of channels, said access multiplexer/channel service unit multiplexing, responsive to the plurality of program logic circuits operating as communications circuits, the plurality of channels to a common format, said access multiplexer/channel service unit testing, responsive to the plurality of program logic circuits operating as testing circuits, the plurality of channels; and a control monitor site for monitoring and controlling operation of said access multiplexer/channel service unit.

13. The system as set forth in claim 12 with a first group of program logic circuits, responsive to the processor, configured as communications circuits for multiplexing a first multiplicity of channels and, simultaneously, with a second group of program logic circuits, responsive to the processor, configured as testing circuits for testing a second multiplicity of channels, the first multiplicity of channels and the second multiplicity of channels being subsets of the plurality of channels, and the first group of program logic circuits and the second group of program logic circuits being subsets of the plurality of program logic circuits.

14. The system as set forth in claim 12 with the access multiplexer/channel service unit testing, responsive to a subset of the plurality of program logic circuits reconfigured to operate as testing circuits, a subset of the plurality of channels.

15. The system as set forth in claim 13 with the access multiplexer/channel service unit interfacing between a high-speed network and low-speed customer premise equipment, the first multiplicity of channels being those channels connecting the access multiplexer/channel service unit to the low-speed customer premise equipment.

16. The system as set forth in claim 13 with the access multiplexer/channel service unit interfacing between a high-speed network and low-speed customer premise equipment, the first multiplicity of channels being those channels connecting the access multiplexer/channel service unit to the high-speed network.

17. A system for remotely controlling a function of an access multiplexer interfacing customer premise equipment to a network, comprising:

a workstation, for initiating a reconfigure signal and for sending the reconfigure signal over a communications channel;

network controlling means, remotely located from the workstation and operatively connected to the workstation via the communications channel, for responding to the reconfigure signal, said network controlling means including program logic means for operating as at least one of communications means and testing means;

memory means for storing software; and processing means, for receiving the reconfigure signal and for reconfiguring, using the stored software, the program logic means; and an access multiplexer, coupled to and controlled by said network controlling means, for multiplexing, responsive to said program logic means operating as communications means, a plurality of signals received from said customer premise equipment to a format suitable for transmission over said network, and for testing, responsive to said program logic means operating as testing means, toward at least one of said customer premise equipment and said network.

18. The system as set forth in claim 17 with the program logic means, responsive to the processing means, reconfigured as communications means for multiplexing a first plurality of channels between said access multiplexer and said customer premise equipment and, simultaneously, configured as testing means for testing a second plurality of channels between said access multiplexer and said customer premise equipment.

19. The system as set forth in claim 17 with the program logic means, responsive to the processing means, reconfigured as testing means for testing a first plurality of channels between said access multiplexer and said customer premise equipment and, simultaneously, configured as communications means for multiplexing a second plurality of channels between said access multiplexer and said network.

20. The system as set forth in claim 17 with the program logic mean, responsive to the processing means, reconfigured as communications means for multiplexing a first plurality of channels between said access multiplexer and said network and, simultaneously, configured as testing means for testing a second plurality of channels between said access multiplexer and said network.

21. The system as set forth in claim 17 with the program logic means, responsive to the processing means, reconfigured as communications means for multiplexing a first plurality of channels between said access multiplexer and said customer premise equipment and, simultaneously, configured as testing means for testing a second plurality of channels between said access multiplexer and said network.

22. A system for remotely controlling a channel service/test unit for interfacing between customer equipment and a network and for remotely reconfiguring the channel service/test unit to operate as at least one of a channel service unit and a channel service test unit, the system comprising:

a workstation for initiating a first reconfigure signal and a second reconfigure signal;

a communications channel, operatively coupled to the workstation, for carrying the first reconfigure signal and the second reconfigure signal;

a channel service/test unit, operatively coupled to the communications channel, for interfacing a plurality of channels from customer premise equipment to the communications channel and for testing at least one of the communications channel and the plurality of channels, the channel service/test unit having a network controller card including, program logic circuits for operating as at least one of the channel service unit and the channel service test unit;

a read-only memory for storing reconfiguration software; and a processor, for receiving the first reconfigure signal and, responsive to the first reconfigure signal, for reconfiguring, using the reconfiguration software, the program logic circuits for operating the channel service/test unit as the channel service test unit, said processor for receiving the second reconfigure signal and, responsive to the second reconfigure signal, for reconfiguring, using the reconfiguration software, the program logic circuits for operating the channel service/test unit as the channel service unit.

23. The system as set forth in claim 22, with the processor, responsive to the first reconfigure signal, reconfiguring, using the reconfiguration software, a first subset of the program logic circuits to operate the channel service/test unit as the channel service test unit with respect to a first subset of the plurality of channels and simultaneously, for those program logic circuits not reconfigured, to operate the channel service/test unit as the channel service unit with respect to a second subset of the plurality of channels.

24. A system for remotely controlling a plurality of channel service units interfacing between customer equipment and a network and for remotely reconfiguring the plurality of channel service units to operate as at least one of a plurality of channel service units and a plurality of test units, the system comprising:

a workstation for initiating reconfigure signals;

a communications channel, coupled to the workstation, for transmitting the reconfigure signals;

a first private branch exchange;

a first channel service unit, operatively coupled to the communications channel and to the first private branch exchange, said first channel service unit having a network controller card, the network controller card including, program logic circuits for operating as at least one of a channel service unit and a test unit responsive to the reconfigure signals;

a read-only memory for storing reconfiguration software; and a processor, for receiving the reconfigure signals and, responsive to the reconfigure signals, for reconfiguring, using the reconfiguration software, the program logic circuits for operating the first channel service unit as at least one of a test unit and a channel service unit;

a second private branch exchange;

a second channel service unit, operatively coupled to the communications channel and to the second private branch exchange, said second channel service unit having a network controller card, the network controller card including, program logic circuits for operating as at least one of a channel service unit and a test unit responsive to the reconfigure signals;

a read-only memory for storing reconfiguration software; and a processor, for receiving the reconfigure signals and, responsive to the reconfigure signals, for reconfiguring, using the reconfiguration software, the program logic circuits for operating the second channel service unit as at least one of a test unit and a channel service unit; and an access multiplexer, operatively coupled to said first channel service unit and to said second channel service unit, for multiplexing signals received from said first channel service unit and from said second channel service unit as multiplexed signals and for transmitting the multiplexed signals over the network.

* * * * *